US005608031A

United States Patent [19]
Yau et al.

[11] Patent Number: 5,608,031
[45] Date of Patent: Mar. 4, 1997

[54] POLYESTERS MODIFIED WITH 1,4-CYCLOHEXANED IMETHANOL HAVING HIGH CLARITY PREPARED UTILIZING AN ANTIMONY CONTAINING CATALYST/STABILIZER SYSTEM

[75] Inventors: Cheuk C. Yau, Kingsport; Leslie S. Moody, Johnson City, both of Tenn.

[73] Assignee: Eastman Chemical Company, Kingsport, Tenn.

[21] Appl. No.: 565,484

[22] Filed: Nov. 30, 1995

[51] Int. Cl.$^6$ ............................. C08G 63/82; C08K 3/32
[52] U.S. Cl. ..................... 528/281; 528/275; 528/285; 528/286; 528/289; 528/291; 528/292; 528/298; 528/300; 528/301; 528/302; 528/307; 528/308; 528/308.6; 524/706; 524/730; 524/408; 524/409; 524/414; 524/417
[58] Field of Search ............................ 528/275, 281, 528/285, 286, 289, 291, 292, 298, 300, 301, 302, 307, 308, 308.6; 524/706, 730, 408, 409, 414, 417

[56] References Cited

U.S. PATENT DOCUMENTS

| | | | |
|---|---|---|---|
| 2,465,319 | 3/1949 | Whinfield et al. | 526/71 |
| 2,641,592 | 6/1953 | Hofrichter, Jr. | 528/280 |
| 2,731,476 | 1/1956 | Peter et al. | 525/259 |
| 3,047,539 | 7/1962 | Pengilly | 528/285 |
| 3,651,016 | 3/1972 | Hrach et al. | 528/276 |
| 3,918,976 | 11/1975 | Arai et al. | 430/521 |
| 4,359,580 | 11/1982 | Grasso | 549/79 |
| 4,403,092 | 9/1983 | Davis et al. | 528/290 |
| 4,420,581 | 12/1983 | McFarlane et al. | 524/431 |
| 4,499,262 | 2/1985 | Fagerburg et al. | 528/279 |
| 4,501,878 | 2/1985 | Adams | 528/286 |
| 4,745,174 | 5/1988 | Pruett et al. | 528/289 |
| 4,790,581 | 12/1988 | Boswell et al. | 292/264 |
| 4,999,418 | 3/1991 | Krutak et al. | 528/272 |
| 5,213,856 | 5/1993 | Po' et al. | 428/34.1 |
| 5,296,587 | 3/1994 | Summer, Jr. et al. | 528/281 |
| 5,372,864 | 12/1994 | Weaver et al. | 428/36.92 |
| 5,384,377 | 1/1995 | Weaver et al. | 525/437 |
| 5,385,773 | 1/1995 | Yau et al. | 428/221 |

FOREIGN PATENT DOCUMENTS

| | | |
|---|---|---|
| 2155920 | 6/1990 | Japan . |
| 93050533 | 3/1993 | Japan . |
| 94/01482 | 1/1994 | WIPO . |

*Primary Examiner*—Samuel A. Acquah
*Attorney, Agent, or Firm*—Betty J. Boshears; Harry J. Gwinnell

[57] ABSTRACT

This invention relates to a polyester resin prepared by adding one or more dicarboxylic acid components to one or more glycol components containing 1,4-cyclohexanedimethanol equalling 100 mole %, the polyester resin having been prepared in the presence of a catalyst/stabilizer system consisting essentially of antimony compounds and phosphorous compounds and compounds selected from the group consisting essentially of zinc compounds, gallium compounds, and silicon compounds.

60 Claims, No Drawings

POLYESTERS MODIFIED WITH 1,4-CYCLOHEXANED IMETHANOL HAVING HIGH CLARITY PREPARED UTILIZING AN ANTIMONY CONTAINING CATALYST/STABILIZER SYSTEM

FIELD OF THE INVENTION

This invention concerns polyester resins having high clarity and good color prepared in the presence of a catalyst/stabilizer system containing one or more antimony compounds, one or more phosphorous compounds and one or more compounds selected from the group consisting essentially of zinc compounds, gallium compounds, and silicon compounds.

BACKGROUND OF THE INVENTION

Traditionally, the synthesis of polyesters requires the use of catalysts to provide a sufficent rate of reaction to be commercially viable. Often, however, the catalysts that encourage the forward polymerization reaction also enhance the rates of degradation reactions. These degradation reactions can result in both an increase in color and a decrease in molecular weight. To minimize these unfavorable side reactions a stabilizing agent is added to the reaction mixture. Antimony compounds are well-known catalysts for polyester production. However, a potential deleterious side reaction of antimony compounds is their reduction to the zero valence state, which imparts a gray color as well as a reduction in clarity to the formed polyester. This side reaction, according to the art, is particularly exacerbated in the presence of the glycol 1,4-cyclohexanedimethanol (CHDM).

Hrach disclosed in U.S. Pat. No. 3,651,016 that polyesters could be prepared using a mixture of metallic antimony, metallic lead and metallic zinc. Lead could be replaced with a mixture of lead and tin. He very specifically pointed out the use of metallic metals. He also did not disclose the use of phosphorus compounds.

Kramer taught in 1993 (DE 4319008, WO 9401482) the use of a combination of antimony, phosphorus and germanium for the preparation of polyesters. He also disclosed that in addition to the mentioned components, the addition of tin, potassium and cobalt compounds can be used.

The Japanese patent (JP 93050533) assigned to Kuraray disclosed the use of a mixture of antimony, phosphorus and zinc for the preparation of polyesters containing 1,9-nonanediol. The patent also proposed the use of 500 ppm antimony trioxide (about 420 ppm of antimony) as part of the catalyst/stabilizer system.

The Japanese patent (JP 2155920) assigned to Mitsubishi mentioned the use of zinc in combination with antimony, titanium, tin and/or cerium.

Research Disclosure (RD 283052) disclosed the preparation of poly(ethylene 2,6-naphthalene dicarboxylate) containing 1,4-CHDM copolyesters using a combination of catalysts where Ti, Zn and Mn were mentioned.

At present, in order to improve the apparent whiteness of polyester fibers or neutral color characteristics of polyester plastics, toners can be incorporated into the polyester to mask or neutralize the yellow color.

U.S. Pat. No. 2,641,592 discloses polyesters containing dimethyl terephthalate with cobalt acetate and antimony.

U.S. Pat. No. 5,385,773 relates to the production of clear, colorless polyesters containing CHDM. This patent states that the antimony reduction reaction results in a grayish appearance in polyester synthesis, especially in the presence of CHDM. The patent discloses the absence of antimony in order to obtain the clear, colorless polyesters.

U.S. Pat. No. 4,745,174, discloses certain 1-cyano-3H-dibenz[f,ij]isoquinoline-2,7-diones which are useful as organic toners for polyester fibers and plastics.

U.S. Pat. No. 4,403,092 discloses colorants useful in the practice of this invention. However, no mention is made in the patent regarding the potential utility of the disclosed compounds as components to produce a good toner system for the polyesters of the invention.

Certain organic toner dyes have been disclosed in U.S. Pat. Nos. 5,372,864; 5,384,377; and 4,745,174. One or more of these patents disclose the use of certain organic toner dyes for use in polyesters generally.

Therefore, polyesters containing 1,4-cyclohexanedimethanol which have good color, good clarity and good mechanical properties would be particularly advantageous.

SUMMARY OF THE INVENTION

This invention relates to a polyester resin prepared by adding one or more dicarboxylic acid components to one or more glycol components, wherein the one or more dicarboxylic acid components is selected from the group consisting of aliphatic dicarboxylic acids having a total of from 3 to 16 carbon atoms, alicyclic dicarboxylic acids having 7 to 12 carbon atoms, aromatic dicarboxylic acids containing a total of from 8 to 16 carbon atoms, and combinations thereof, and wherein 0.5 mole % or more of the one or more glycol components is 1,4-cyclohexanedimethanol and wherein the remaining 99.5 mole % or less of the one or more glycol components is selected from the group consisting of glycols other than 1,4-cyclohexanedimethanol having from 2 to 12 carbon atoms, glycol ethers having from 4 to 12 carbon atoms, and combinations thereof, the total mole percentages of the one or more glycol components equalling 100 mole %, the polyester resin having been prepared in the presence of a catalyst/stabilizer system consisting essentially of one or more antimony compounds and one or more phosphorous compounds and one or more compounds selected from the group consisting essentially of zinc compounds, gallium compounds, and silicon compounds.

The invention also relates to a method for preparing these polyesters.

The invention further relates to the use of inorganic dyes and organic dyes in the polyester compositions and in the methods of the present invention.

It has been unexpectedly found that the presence of zinc, gallium, or silicon or combinations thereof in combination with antimony compounds and phosphorous compounds can effectively reduce the negative effect of the presence of antimony metal particles which leads to the loss of clarity of the CHDM-modified polyesters.

Therefore, this invention provides the advantages of good mechanical properties along with good color and good clarity for the polyesters described.

DETAILED DESCRIPTION OF THE PREFERRED EMBODIMENTS

This invention relates to a polyester resin prepared by adding one or more dicarboxylic acid components to one or more glycol components. The polyester resin is prepared in the presence of a catalyst/stabilizer system consisting essentially of one or more antimony compounds and one or more phosphorous compounds and one or more compounds selected from the group consisting essentially of zinc compounds, gallium compounds, and silicon compounds.

The one or more dicarboxylic acid components is selected from the group consisting of aliphatic dicarboxylic acids having a total of from 3 to 16 carbon atoms, alicyclic dicarboxylic acids having 7 to 12 carbon atoms, aromatic dicarboxylic acids containing a total of from 8 to 16 carbon atoms, and combinations thereof.

It is preferable that terephthalic acid is present in the amount of at least 50 mole %, preferably 75 to 100 mole % and more preferably, 90 to 100 mole %, even more preferably 95 to 100 mole %, based on the total mole percentages of the acids present in the polyester being 100 mole %.

It is preferable that the dicarboxylic acid component of the copolyester may comprise repeat units of from 50 mole % or less of one or more other dicarboxylic acids besides terephthalic acid, or suitable synthetic equivalents such as dimethyl terephthalate.

Dicarboxylic acids useful in the dicarboxyic acid component of the invention include, but are not limited to aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms.

Particularly preferred examples of dicarboxylic acids other than terephthalic acid to be used in forming the copolyester of the invention include: isophthalic acid, 2,6-naphthalenedicarboxylic acid, 2,7-naphthalene dicarboxylic acid, 1,5-naphthalenedicarboxylic acid, 1,4-cyclohexanedicarboxylic acid, 1,2 -cyclohexanedicarboxylic acid, 1,3-cyclohexanedicarboxylic acid, 1,4-cyclohexane-diacetic acid, diphenyl-4,4'-dicarboxylic acid, succinic acid, glutaric acid, adipic acid, azelaic acid, sebacic acid, 1,12-diodecanedioicacid, and the like. Of these dicarboxylic acids to be included with terephthalic acid, isophthalic acid is preferred. Copolyesters may be prepared from one or more of the above dicarboxylic acids.

The term "aliphatic-dicarboxylic acid" is used to denote straight or branched chain alkanedicarboxylic acids containing 3 to 16 carbons. Typical aliphatic dicarboxylic acid include succinic acid, glutaric acid, adipic acid, sebacic acid, suberic, 2,2,4-trimethyladipic, 1,12-dodecanedioic acid and the like.

The term "alicyclic dicarboxylic acid" is used to denote cycloalkane dicarboxylic acids which contain a total of 7 to 12 carbon atoms preferably 1,2-, 1,3- and 1,4-cyclohexanedicarboxylic acids.

The term "aromatic dicarboxylic acid" is used to denote dicarboxylic acid derivatives of benzene, naphthalene, biphenyl, diphenylether, diphenylsulfone and these substitutes with $C_1$–$C_4$ alkyl or halogen (fluorine, chlorine, bromine or iodine). Typical aromatic dicarboxylic acids, include terephthalic acid, isophthalic acid, phthalic acid, 1,4-naphthalene dicarboxylic acid, 2,6-naphthalenedicarboxylic, 4,4'-biphenyldicarboxylic acid, 2-bromoterephthalic acid, 2,5-dibromoterephthalic acid, tetrachlorophthalic acid and the like. Terephthalic acid, isophthalic acid and 2,6-naphthalenedicarboxylic acid are the preferred aromatic dicarboxylic acids.

It should be understood that the dicarboxylic acid can arise from the corresponding acid anhydrides, esters, and acid chlorides of these acids.

It is preferable that 0.5 mole % or more, of the one or more glycol components is 1,4-cyclohexanedimethanol. Other preferred embodiments are 0.5 to 99.5 mole %, 0.5 to 95 mole %, 0.5 to 70 mole % and 15 to 65 mole % of 1,4-cyclohexanedimethanol. The remaining one or more glycol components are selected from the group consisting of glycols (other than 1,4-cyclohexanedimethanol) which have from 2 to 12 carbon atoms, glycol ethers having from 4 to 12 carbon atoms, and combinations thereof, the total mole percentages of the one or more glycol components equalling 100 mole %.

Suitable diol components of the described poly-esters other than 1,4-cyclohexanedimethanol may be selected from ethylene glycol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,3-cyclohexanedimethanol, Z,8-bis(hydroxymethyl)-tricyclo-[5.2.1.0]-decane wherein Z represents 3, 4, or 5; and diols containing one or more oxygen atoms in the chain, e.g., diethylene glycol, triethylene glycol, dipropylene glycol, tripropylene glycol and the like. In general, these diols contain 2 to 18, preferably 2 to 8 carbon atoms. Cycloaliphatic diols can be employed in their cis or trans configuration or as mixtures of both forms.

It is preferred that ethylene glycol comprises 0.5 to 99.5 mole %, more preferably, 30 to 99.5 mole % and more preferably, 35 to 85 mole %, of the glycol component of the polyester of the invention.

Preferred polyesters are those containing from about 75 to 100 mole percent terephthalic acid residues and from about 65 to 99.5 mole percent ethylene glycol residues. More particularly preferred polyesters are those containing from about 90 to 100 mole percent terephthalic acid residues and from about 85 to 99.5 mole percent, preferably 90 to 99.5 mole percent ethylene glycol residues. Also, particular preferred polyesters are those containing from about 90 to 100 mole percent terephthalic acid and 65 to 80 mole percent ethylene glycol.

The polyesters referred to herein include thermoplastic, crystalline or amorphous polyesters produced by conventional polymerization techniques from one or more diols and one or more dicarboxylic acids. The polyesters normally are molding or fiber grade and have an inherent viscosity (I.V.) of about 0.1 to about 1.2 dL/g, more preferably 0.1 to 0.9 dL/g, and even more preferably, 0.4 to 0.8 dL/g as measured at 25° C. in a 60/40 ratio by weight of phenol/tetrachloroethane.

The copolyester resins useful in the blend of this invention are well known and are commercially available. Methods for their preparation are described, for example, in U.S. Pat. Nos. 2,465,319 and 3,047,539. For example, they may be prepared by either melt phase polymerization, solid state polymerization or both.

Copolyesters containing substantially only ethylene glycol, 1,4-cyclohexanedimethanol and terephthalic acid or substantially only ethylene glycol, 1,4-cyclohexanedimethanol, isophthalic and terephthalic acid are preferred.

The polyesters may be prepared according to polyester forming conditions well known in the art. For example, a mixture of one or more dicarboxylic acids, preferably aromatic dicarboxylic acids, and one or more diols may be heated in the presence of esterification and/or polyesterification catalysts at temperatures in the range of about 150° to about 300° C., and pressures of atmospheric to about 0.1 mm Hg. Normally, the dicarboxylic acid is esterified with the diol(s) at about 10 to 110 psi, preferably 20 to 60 psi above atmospheric pressure and at a temperature at the lower end of the specified range. Polycondensation then is effected by increasing the temperature and lowering the pressure while excess diol is removed from the mixture.

A preferred temperature range for a polyester condensation is about 225° C. to about 300° C.

It is preferred in the cases of polyester containing greater than 5 mole % 1,4-cyclohexanedimethanol, based on the glycol components being present at a total of 100 mole percent, that the polycondensation reaction time is less than 8 hours, preferably less than 4.0 hours and more preferably less than 3.0 hours.

By the term "consisting essentially of", it is meant that other compounds including thermal stabilizers may be used, but not in catalytic amounts. Other compounds besides the antimony compounds, phosphorous compounds, zinc compounds, silicon compounds, and gallium compounds may be present in the catalyst/stabilizer system in non-catalytic amounts, such as from less than or equal to 10 ppm in the polyester compositions of the invention.

In a preferred embodiment, organic dyes and inorganic dyes are useful in the polyesters of the invention. Preferred organic dyes are ones falling within the classes of anthraquinones and anthrapyridones. Preferred inorganic dyes are cobalt compounds such as cobalt acetate. When cobalt compounds are used, it is preferred that they are present in the amount of 5 to 100 ppm.

When the organic dyes of the invention are used as toners, this means that it is used in an amount sufficient to improve the apparent whiteness of the polyester. This amount is generally from about 0.1 to 10 ppm. These dyes can also used in an amount sufficient to impart a substantial amount of color to the polyester. If color is intended to be imparted to the polyester, the dye should be present in an amount greater than 10 ppm.

Included within the definition of phosphorous compounds are phosphorus-based stabilizers such as alkyl phosphates, aryl phosphates, inorganic phosphates, phosphates, phosphoric acid and phosphoric acid esters. Preferred phosphorus compounds are phosphates and phosphoric acid.

Preferred antimony compounds utilized in the present invention are antimony compounds having valences of three or five which are known in the art.

Examples of antimony compounds useful in the context of the invention include, but are not limited to the following: tributyl antimony oxide, $KSb(OH)_6$, $NH_4SbF_6$ and $SBS_3$, antimonate esters of inorganic acids, cyclic alkyl antimonate esters and aryl antimonic acid compounds such as potassium antimony, antimony Oxide, antimony trioxide, antimony alkoxide, such as antimony isopropoxide, antimony halide, such as antimony chloride, antimony bromide, and antimony fluoride, antimony sulfide, sodium or potassium antimonate, antimony carboxylates such as antimony acetate, antimony glycolate and the like.

Examples of preferred antimony compounds are: antimony carboxylate, especially antimony triacetate, antimony oxide, antimony trioxide, antimony glycolate (either formed separately or during polymerization), and the like.

It is preferred that the catalyst/stabilizer system comprises one or more antimony compounds in the total amount of 20 to 300 ppm, 75 to 125 ppm, and one or more phosphorous compounds in the total amount of 1 to 100 ppm, preferably 5 to 80 ppm.

When one or more of zinc compounds, silicon compounds and gallium compounds are employed, it is preferred that the zinc compound be present in the amount of 25 to 100 ppm, that the silicon compound be present in the amount of 50 to 500 ppm, and that the gallium compounds be present in the amount of 5 to 100 ppm.

In a preferred embodiment of the invention, at least one each of the zinc compounds, silicon compounds and the gallium compounds are employed.

Examples of zinc compounds useful in the invention include, but are not limited to: zinc acetate and its dihydrate, zinc succinate, zinc isophthalate and zinc adipate, zinc sulfate and zinc oxide.

Examples of gallium compounds useful in the invention include, but are not limited to: gallium chloride, gallium nitrate hydrate, gallium oxide and gallium lactate and gallium phosphide.

Examples of silicon compounds useful in the invention include, but are not limited to: silicon acetate and tetraethyl orthosilicate.

In the catalyst/stabilizer system of this invention, "ppm" of catalyst/stabilizer system refers to weight of the element and is based on the theoretical weight of the final polymer.

Typical organic toner dyes which are useful in the practice of this invention are those disclosed in U.S. Pat. Nos. 5,372,864; 5,384,377; and 4,745,174. Particularly preferred dyes are ones described in U.S. Pat. No. 5,384,377, incorporated herein by reference. These preferred dyes are certain blue substituted 1,4-bis(2,6-dialkylanilino) anthraquinones in combination with selected red anthraquinone and anthrapyridone (3H-dibenz[f,j]isoquinoline-2,7-dione) compounds. These dyes which provide a toner system useful in imparting a desirable neutral to slightly blue hue to polyesters having a yellow appearance. The thermally stable colored compounds have reactive groups and can be incorporated into the polyester polymer structure during polymerization.

In this preferred embodiment, a major portion of at least one 1,4-bis(2,6-dialkylanilino) anthraquinone(s) of formula (I) is used:

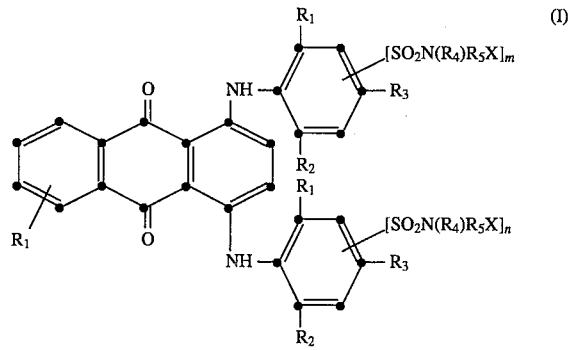

wherein:

R is selected from the group consisting of hydrogen, $C_1$–$C_6$ alkyl, halogen, carboxy, and $C_1$–$C_6$

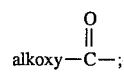

$R_1$ and $R_2$ are independently $C_1$–$C_6$-alkyl;

$R_3$ is selected from the group consisting of hydrogen, halogen, $C_1$–$C_6$-alkyl, substituted $C_1$–$C_6$ alkyl, hydroxy, $C_1$–$C_6$-alkoxy, substituted $C_1$–$C_6$-alkoxy, cyano, thiocyano, $C_1$–$C_6$-alkylthio, substituted $C_1$–$C_6$-alkylthio, $C_1$–$C_6$-alkylsulfonyl, substituted $C_1$–$C_6$-alkylsulfonyl, $C_1$–$C_6$-alkoxycarbonyl, carboxy, aryloxy, arylthio, arylsulfonyl, and $SO_2N(R_4)R_5X$ when m and/or n are zero;

$R_4$ is selected from the group consisting of hydrogen, $C_1$–$C_6$-alkyl, substituted $C_1$–$C_6$-alkyl, $C_3$–$C_8$-alkenyl, $C_3$–$C_8$-alkynyl, $C_3$–$C_7$-cycloalkyl and aryl;

$R_5$ is a linking group selected from the group consisting of $C_1$–$C_8$-alkylene, $C_1$–$C_6$-alkylene-Z-$C_1$–$C_6$-alkylene, arylene-$C_1$–$C_6$-alkylene, arylene-Z-$C_1$–$C_6$-alkylene, $C_3$–$C_7$-cycloalkylene, $C_1$–$C_6$-alkylene-cycloalkylene-$C_1$–$C_6$-alkylene, $C_1$–$C_6$-alkylene-arylene-$C_1$–$C_6$-alkylene, and $C_1$–$C_6$-alkylene-Z-arylene-Z-$C_1$–$C_6$-alkylene, wherein Z is selected from —O—, —S— or $SO_2$;

X is hydrogen or a polyester reactive group; and m and n are independently 0 or 1; with the proviso that at least one polyester reactive group is present.

The red components which may be blended with blue components of formula I above have the following structural formulae II–X:

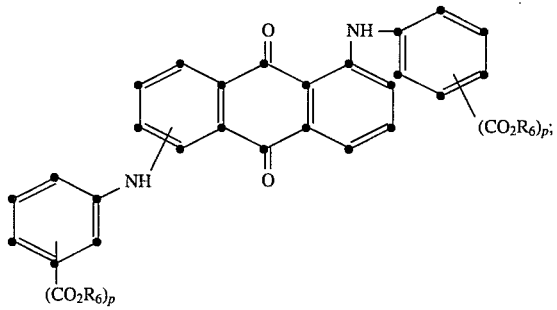

II

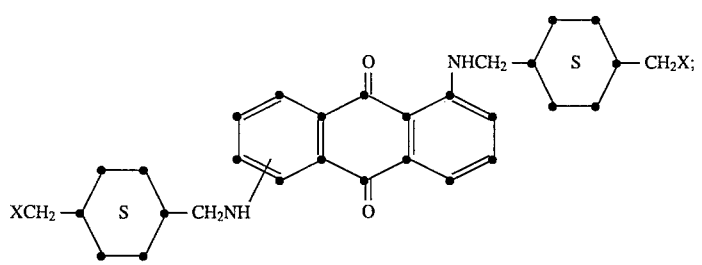

III

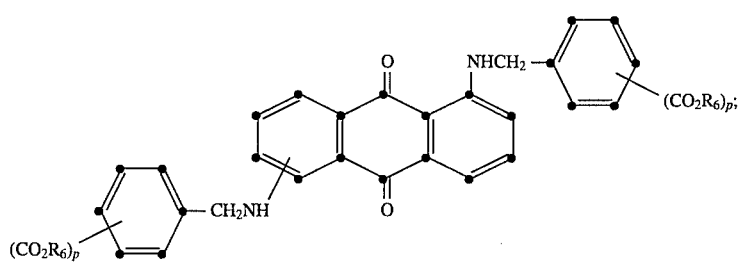

IV

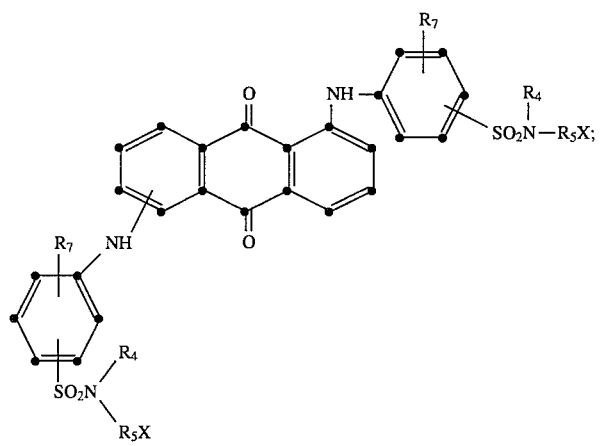

V

-continued

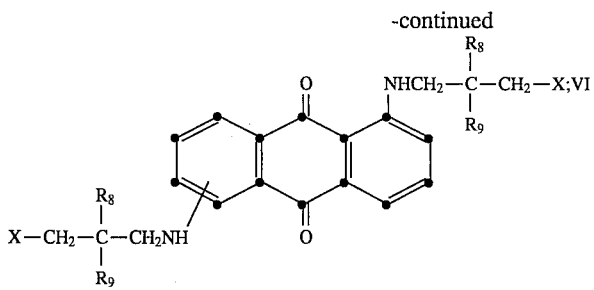
VI

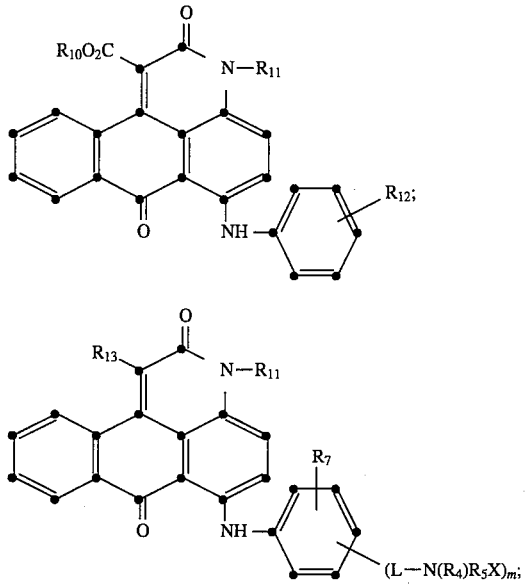
VII

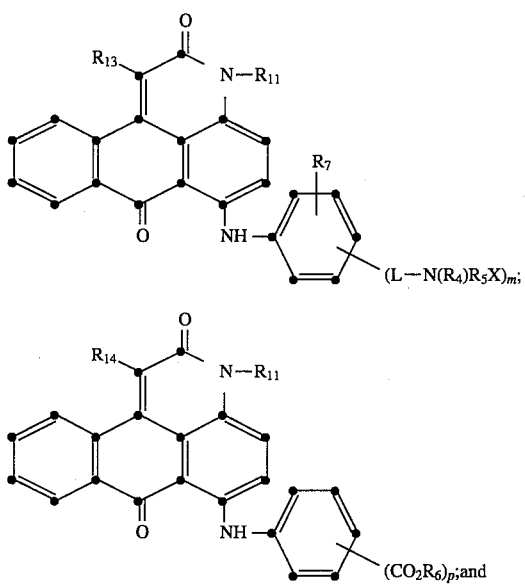
VIII

IX

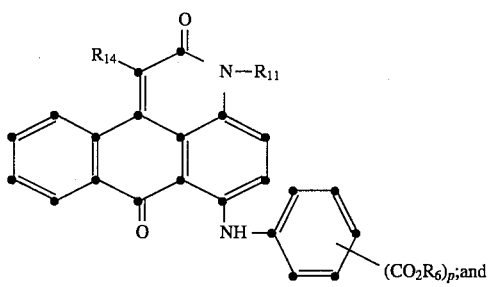

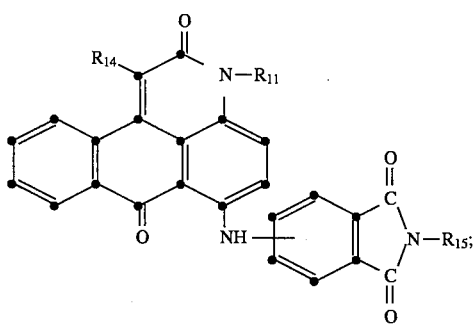
X wherein:

$R_6$ is selected from the group consisting of hydrogen, $C_1-C_6$-alkyl, substituted $C_1-C_6$-alkyl, $C_3-C_7$-cycloalkyl or aryl;

$R_7$ is hydrogen or one to three groups selected from $C_1-C_6$-alkyl, substituted $C_1-C_6$ alkyl, $C_1-C_6$-alkanoylamino, halogen, hydroxy, $C_1-C_6$-alkyl $C_1-C_6$-alkoxy, $C_1-C_6$-alkylthio;

$R_8$ and $R_9$ are the same or different and are selected from the group consisting of $C_1-C_6$-alkyl, substituted $C_1-C_6$-alkyl, $C_3-C_7$-cycloalkyl or aryl;

$R_{10}$ is selected from the group consisting of $C_1-C_6$-alkyl, $C_3-C_7$-cycloalkyl or aryl;

$R_{11}$ is selected from the group consisting of hydrogen, $C_1-C_{12}$-alkyl, substituted $C_1-C_{12}$-alkyl, $C_3-C_7$-cycloalkyl and aryl;

$R_{12}$ is hydrogen or one to three groups selected from the group consisting of $C_1-C_6$-alkyl, substituted $C_1-C_6$-alkyl, $C_1$–$C_6$-alkoxy, substituted $C_1$–$C_6$-alkoxy, $C_1$–$C_6$-alkylthio, substituted $C_1$–$C_6$-alkylthio, halogen, hydroxy, $C_1$–$C_6$-alkanoylamino, aroylamino, $C_1$–$C_6$-alkylsulfonylamino and arylsulfonylamino;

$R_{13}$ and $R_{14}$ are selected from hydrogen, cyano or $CO_2R_{10}$;

$R_{15}$ is $R_4$ or $R_5X$ as previously defined;

L is —CO— or —$SO_2$—; X is as previously defined; m is 0 or 1; p is 1 or 2; with the provisos that $R_{13}$ is hydrogen when m is 0 and at least one polyester reactive group is present.

The term "polyester reactive group" is used herein to describe a group which is reactive with at least one of the functional groups from which the polyester is prepared under polyester forming conditions. Examples of the groups which X may represent include hydroxy, carboxy, an ester group, amino, $C_1$–$C_6$-alkylamino, etc. The ester radicals may be any radical having the formula

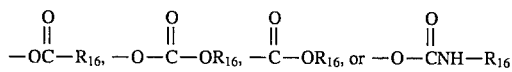

wherein $R_{16}$ is selected from the group consisting of $C_1$–$C_6$-alkyl, substituted $C_1$–$C_6$-alkyl, $C_3$–$C_7$-cycloalkyl or aryl. Reactive group X is preferably hydroxy, carboxy, $C_1$–$C_2$-alkoxycarbonyl or acetoxy.

In the terms "substituted $C_1$–$C_6$-alkyl", "substituted $C_1$–$C_{12}$-alkyl", "substituted $C_1$–$C_6$-alkoxy", "substituted $C_1$–$C_6$-alkylthio", "substituted $C_1$–$C_6$-alkylsulfonyl", "$C_1$–$C_6$-alkylsulfonylamido", "substituted alkylene", "$C_1$–$C_6$-alkoxycarbonyl", the alkyl and alkylene groups or portions of the groups may contain as further substituents one or more groups, preferably one to three groups selected from the group consisting of hydroxy, halogen, cyano, aryl, aryloxy, arylthio, $C_1$–$C_4$-alkylthio, $C_1$–$C_4$-alkylthio, $C_3$–$C_7$-cycloalkyl, $C_1$–$C_4$-alkanoyloxy and —(—O—$R_{17}$—)$_p$—$R_{18}$, wherein $R_{17}$ is selected from the group consisting of $C_1$–$C_6$-alkylene, $C_1$–$C_6$-alkylenearylene, cyclohexylene, arylene, and $C_1$–$C_6$-alkylenecyclohexylene; $R_{18}$ is selected from the group consisting of hydrogen, hydroxy, carboxy, $C_1$–$C_4$-alkanoyloxy, $C_1$–$C_4$-alkoxycarbonyl, aryl, and $C_3$–$C_7$-cycloalkyl; and p is 1, 2, 3, or 4.

The term "aryl" as used herein preferably denotes phenyl and phenyl substituted with one to three substituents selected from the group consisting of $C_1$–$C_6$-alkyl, $C_1$–$C_6$-alkoxy, halogen, carboxy, cyano, $C_1$–$C_6$-alkylthio, $C_1$–$C_6$-alkylsulfonyl, trifluoromethyl, hydroxy, $C_1$–$C_6$-alkanoyloxy, $C_1$–$C_6$-alkanoylamino, and $C_1$–$C_6$-alkoxycarbonyl.

The term "arylene" includes 1,2-,1,3- and 1,4-phenylene and such radicals substituted one to three times with $C_1$–$C_6$-alkyl, $C_1$–$C_6$-alkoxy, $C_1$–$C_6$-alkoxycarbonyl, or halogen.

The terms "$C_3$–$C_8$-alkenyl" and "$C_3$–$C_8$-alkynyl" are used to denote aliphatic hydrocarbon moieties having 3–8 carbons and containing at least one carbon-carbon double bond and one carbon-carbon triple bond, respectively.

The term "halogen" is used to indicate bromine, chlorine, fluorine, and iodine.

The terms "$C_1$–$C_6$-alkanoyloxy" and "$C_1$–$C_6$-alkanoylamino" are used to represent radicals of the formula

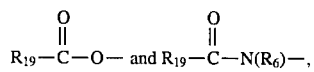

respectively, wherein $R_{19}$ is a straight or branched chain $C_1$–$C_6$-alkyl radical and $R_6$ is as defined above.

Thus, the polyester of the invention is suitable for molding, extrusion, packaging, and fibers may have copolymerized therein a blue 1,4-bis(2,6-dialkylanilino) anthraquinone compounds of Formula (I) plus a red anthraquinone or anthrapyridone compounds of formula (II)–(X) above. Preferred are blends having at least one blue 1,4-bis(2,6-dialkylanilino) anthraquinone compound of formula (I), along with a red anthraquinone or anthrapyridone compound of formulae (II)–(X) above. The composition may be a neat blend of the red and blue compounds or the composition may be pre-dissolved in one of the polyester's monomeric species, e.g., ethylene glycol.

The total amount of toner components added depends, of course, on the amount of inherent yellow color in the polyester. Generally, a maximum concentration of about 10 ppm of combined toner components and a minimum concentration of about 0.5 ppm are required with about 1–7 ppm of blue component (I) in combination with about 0.5–3 ppm of red components of formulae (II–X) being preferred.

In a preferred embodiment of the present invention, the blue anthraquinone compound corresponds to structure (I) above, wherein R is hydrogen; $R_1$ and $R_2$ are independently selected from methyl and ethyl; $R_3$ is hydrogen, methyl, or bromo; $R_4$ is hydrogen, $C_1$–$C_4$-alkyl or aryl; $R_5$ is selected from the group consisting of $C_1$–$C_6$-alkylene, $C_1$–$C_4$-alkylene-O-$C_1$–$C_4$-alkylene, —$CH_2C_6H_{10}CH_2$—, arylene, or —$CH_2$-arylene- and the red component corresponds to formula (V), wherein $R_7$ is $C_1$–$C_6$-alkoxy and $R_4$ and $R_5$ are as defined above for the preferred blue component (I).

In an especially preferred embodiment of the present invention, the blue compound of formula (I) is

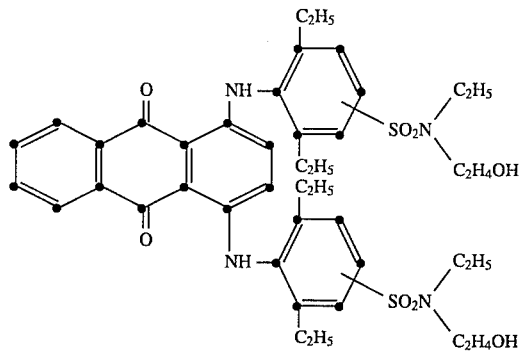

and the red compound of formula (V) is

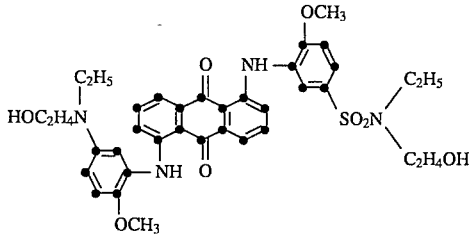

The blue anthraquinones of formula (I) can be prepared in general by reaction of leuco quinizarin (1,4,9,10-tetrahydroxyanthracene) compounds with an excess aromatic amines, preferably in the presence of acid catalysts such as boric acid as described in U.S. Pat. No. 3,918,976, incorporated herein by reference and as follows:

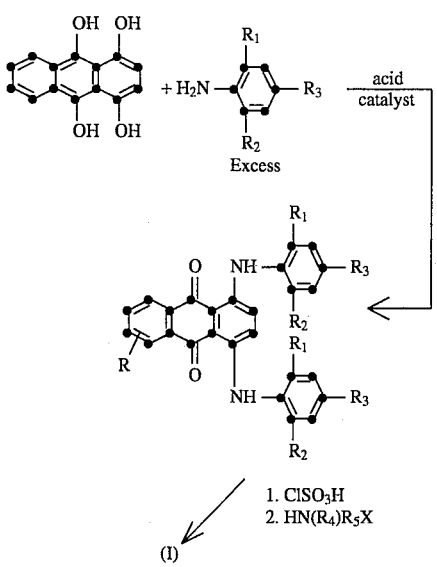

The 1,4-bis(2,6-dialkylanilino)anthraquinone compounds thus produced are readily functionalized if needed by first chlorosulfonating with chlorosulfonic acid to produce disulfonyl chlorides which can be reacted with amines containing polyester reactive groups, the general method being disclosed in U.S. Pat. No. 2,731,476, incorporated herein by reference.

Typical amines corresponding to formula $HN(R_4)R_5X$ include 2-aminoethanol, 2,2-iminodiethanol, 1-amino-2,3-propandiol, 2-methylaminoethanol, 2-ethylaminoethanol, 2-anilinoethanol, methyl anthranilate, methyl m-amino benzoate, p-aminobenzoic acid, m-aminophenol, 6-aminohexanoic acid, β-alanine, glycine ethyl ester, 2-(p-aminophenyl)ethanol, 2-(p-aminophenoxy)ethanol 4-aminomethylcyclohexanemethanol and 3-amino-2,2-dimethyl-1-propanol.

Red compounds (II) can be prepared by reacting 1,5-dichloroanthraquinone and/or 1,8-dichloro-anthraquinone or mixtures thereof with o, m- and p-aminobenzoic acids (and esters thereof) by a modified Ullmann reaction involving nitrogen arylation of the anilines in the presence of copper catalysts (see U.S. Pat. No. 4,359,580, incorporated herein by reference).

Red compounds of formula (III) can be prepared as described in U.S. Pat. No. 4,420,581 and compounds of formula (VI) can be prepared as in U.S. Pat. No. 4,999,418, incorporated herein by reference.

Red anthraquinone compounds of formula (IV) can be prepared by reacting 1,5-dichloroanthraquinone and 1,8-dichloroanthraquinone or mixtures thereof with substituted benzyl amines by procedures similar to those used in preparing compounds of formulae (III) and (VI).

Red anthrapyridone compounds (VII) can be prepared as disclosed in U.S. Pat. No. 4,790,581 incorporated herein by reference; procedures useful in preparing red-violet anthrapyridone compounds (VIII) and (IX) are disclosed in U.S. Pat. No. 4,745,174, incorporated herein by reference.

The preferred organic toner dyes are selected from the classes of anthraquinones and anthrapyridones which are thermally stable at the reactor temperatures used to produce the polyesters. This invention is not limited to the dyes specifically described in these patents, however. The levels of dyes present in the invention may vary depending on the extinction coefficient of the particular compound as well as the amount of color generated under the polymerization conditions.

The organic dyes or inorganic dyes useful in the polyester compositions of the present invention can be added before, during or after the polymerization. It is preferable to add it during the polymerization.

The process of the invention involves the preparation of the polyester of invention. In this process, a polyester is prepared having good mechanical properties as well as good color and good clarity. The preferred embodiments of the invention for the polyester of the invention are also applicable to the process of the invention.

The polyester compositions of the invention may contain other additives such as branching agents and chain extension agents, free radical stabilizers such as hindered phenols, flame retardants, tougheners, epoxy compounds, mold release agents, nucleating agents, and other colorants which may also be desirable in such formulations.

Such additives are generally present at 0.1 to about 20 weight % based on the total weight of said polyester composition.

Useful flame retardants, include, but are not limited to, brominated polystyrene combined with sodium antimonate.

Examples of reinforcing agents used in combination with the polyesters of its invention include are glass fibers, carbon fibers, mica, clay, talc, wollastonite, and calcium carbonate. A particularly preferred reinforcing agent is glass fiber. It is preferable that the glass fibers be present in the polyester composition at from 0.1 to 40 %, preferably 0.1 to 30 %, by weight based on the total weight of said polyester composition.

Glass fibers suitable for use in compositions containing the polyesters of the invention may be in the form of glass filaments, threads, fibers, or whiskers, etc., and may vary in length from about ⅛ inch to about 2 inches. Chopped glass strands having a length of about ⅛ inch to about ¼ inch are preferred. Such glass fibers are well known in the art. Of course, the size of these glass fibers may be greatly diminished depending on the blending means employed, even to lengths of 300 to 700 microns or lower.

The polyester compositions of the invention may be reinforced with a mixture of glass and other reinforcing agents as described above, such as mica or talc, and/or with other additives.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise indicated.

EXAMPLES

The clarity of the polyesters was determined from the turbidity of a solution of the sample. The procedure is described as follows.

Determination of Solution Turbidity 2.30 g of the polymer samples were placed into a 8-dram vial. 30 mL of a mixture of hexafluoroisopropyl alcohol/methylene chloride, 30:70 v/v (volume per volume) was added. When a solution was obtained, the solution was transferred to a Hach vial and the turbidity was measured using a Hach Ratio Turbidimeter, Model 18900, available from Hach Instruments (Fort Collins, Colo.). Calibration was performed before each measurement using the Gelex secondary turbidity standard, 0–20 NTU range. The results were read in NTU (Nephelometric turbidity units). The procedure was repeated. (The lower the turbidity values, the better the results.)

It is preferred that the number of NTU units for the polyester of the invention be 12 or less, more preferably, 10 or less, and even more preferably, 6 or less, and even more preferably, 4 or less.

A factorial experiment was executed to determine the effect of catalysts on the clarity of the polymer. The results are shown in Table 1. To show the beneficial effect of zinc, the results of two runs having manganese and two different levels of antimony are also shown in the Table 1.

The data clearly show that when zinc is included in the system, low turbidity results even with wide variations in the catalysts (Co, Sb and P). However, when Mn is used instead of zinc, high turbidity results. This clearly demonstrates the benefit of using zinc in combination with antimony.

TABLE 1

Haze as a Function of Catalyst Metal Levels.

| System | Co* | Sb* | P* | Zn* | Mn* | Haze (ntu) |
|---|---|---|---|---|---|---|
| 1 | 21 | 89 | 20 | 51 | 0 | 2.5 |
| 2 | 20 | 56 | 10 | 53 | 0 | 0.9 |
| 3 | 41 | 54 | 11 | 52 | 0 | 1.4 |
| 4 | 21 | 91 | 10 | 51 | 0 | 0.6 |
| 5 | 40 | 84 | 22 | 50 | 0 | 1.6 |
| 6 | 21 | 54 | 21 | 50 | 0 | 1.8 |
| 7 | 40 | 90 | 11 | 51 | 0 | 1.7 |
| 8 | 41 | 53 | 20 | 51 | 0 | 1.6 |
| 9 | 20 | 93 | 12 | 74 | 0 | 2.4 |
| 10 | 20 | 78 | 20 | 68 | 0 | 2.0 |
| 11 | 39 | 192 | 21 | 53 | 0 | 3.6 |
| 12 | 41 | 88 | 20 | 0 | 51 | 22 |
| 13 | 40 | 182 | 21 | 0 | 51 | 15.2 |

*ppm by weight as the element and based on the theoretical final weight of the polymer This demonstrates that the addition of zinc compounds improves the clarity of the polyester for both the DMT-based and TPA-based processes. It is noted that the improvement is much more pronounced for the DMT-based process than the TPA-based process. The results are shown in Table 2. It is also demonstrated that gallium compounds and silicon compounds also improve the clarity of the polyester. The results are also shown in Table 2.

It is also noted that the use of a TPA-based process itself results in higher clarity.

TABLE 2

Relationship Between Haze and Nature of Catalyst Metals.

| System | Co | Sb | P | Mn | Zn | Ga | Si | Haze (ntu) | Starting Acid Component |
|---|---|---|---|---|---|---|---|---|---|
| 14 | 41 | 88 | 20 | 51 | 0 | 0 | 0 | 22 | DMT* |
| 15 | 40 | 84 | 22 | 0 | 50 | 0 | 0 | 1.6 | DMT |
| 16 | 40 | 182 | 21 | 51 | 0 | 0 | 0 | 15.2 | DMT |
| 17 | 39 | 192 | 21 | 0 | 53 | 0 | 0 | 3.6 | DMT |
| 18 | 44 | 136 | 20 | 0 | 0 | 0 | 0 | 5.8 | TPA* |
| 19 | 43 | 136 | 21 | 0 | 50 | 0 | 0 | 3.5 | TPA |
| 20 | 47 | 106 | 20 | 0 | 0 | 0 | 0 | 6.0 | TPA |
| 21 | 44 | 104 | 20 | 0 | 51 | 0 | 0 | 3.4 | TPA |
| 22 | 43 | 94 | 20 | 0 | 0 | 29 | 0 | 3.0 | TPA |
| 23 | 42 | 89 | 20 | 0 | 0 | 30 | 0 | 2.9 | TPA |
| 24 | 42 | 97 | 21 | 0 | 0 | 0 | 410 | 2.0 | TPA |
| 25 | 45 | 90 | 22 | 59 | 0 | 0 | 0 | 9.8 | DMN* |
| 26 | 44 | 99 | 25 | 0 | 51 | 0 | 0 | 5.9 | DMN |

*DMT = dimethyl terephthalate; TPA = terephthalic acid; DMN = dimethyl 2,6-naphthalenedicarboxylate.

EXAMPLE 1

Preparation of Poly (co-70 mole %-ethylene-30 mole %-1, 4-cyclohexanedimethylene terephthalate) DMT-Based Procedure.

A 500 mL round-bottom glass flask, equipped with a nitrogen inlet, a condensate outlet, an additive inlet and a stirrer, was charged with 0.5 mole of dimethyl terephthalate, 0.845 mole of ethylene glycol, 0.155 mole of 1,4-cyclohexanedimethanol, zinc (as zinc acetate, 50 ppm* as Zn based on the final polymer). The reaction flask was well purge with nitrogen and was heated to 190° C. The molten mixture was kept at 190° C. for 60 minutes and the temperature was raised to 220° C. After 60 minutes, the temperature was set to 275° C., and phosphorus (as triethyl phosphate, 10 ppm as P based on the final polymer), cobalt (as cobaltous acetate tetrahydrate, 20 ppm as Co based on the final polymer) and antimony (as antimony triacetate, 93 ppm as Sb based on the final polymer) were added. Vacuum was applied and the pressure reduced to 100 torr over 3 minutes, and this pressure was maintained for 54 minutes. The pressure was then further reduced to 0.50 torr over 5 minutes and maintained for 210 minutes. The vacuum was relieved to atmospheric pressure using nitrogen. An extremely clear polymer melt resulted. The polymer was separated from the flask and ground to pass a 3-mm mesh screen.

* ppm by weight as the element and based on the theoretical weight of final polymer.

EXAMPLE 2

Preparation of Poly (co-70 mole %-ethylene-30 mole %-1, 4-cyclohexanedimethylene terephthalate) TPA-Based Procedure.

Catalyst-free TPA-based co-70 mole %-ethylene-30 mole %-1,4-cyclohexanedimethylene terephthalate oligomers (0.45 mole) were placed in a 500 mL round-bottom glass flask, equipped with a nitrogen inlet, a condensate outlet, an additive inlet and a stirrer. The system was purged with nitrogen. The oligomers were then melted at 245° C. and the temperature was raised to 266° C. over 20 minutes. The melt was held at 266° C. for 40 minutes and zinc (as zinc acetate, 50 ppm* as Zn based on the final polymer) was added. These conditions were maintained for 60 minutes and then phosphorus (as triethyl phosphate, 20 ppm as P based on the final polymer), cobalt (as cobaltous acetate tetrahydrate, 40 ppm as Co based on the final polymer) and antimony (as antimony triacetate, 100 ppm as Sb based on the final polymer) were added to the reaction mixture. The pressure was then reduced to 100 torr and the temperature raised to 275° C. over 6 minutes. These conditions were maintained for 19 minutes. The pressure was further reduced to 0.50 torr over 10 minutes. The temperature was then ramped to 286° C. over 60 minutes. After 60 minutes, the vacuum was relieved to atmospheric pressure with nitrogen. An extremely clear polymer melt resulted. The polymer was separated from the flask and ground to pass a 3-mm mesh screen.

* ppm by weight as the element and based on the theoretical weight of final polymer.

EXAMPLE 3

Preparation of Poly (co-70 mole %-ethylene-30 mole %-1, 4-cyclohexanedimethylene 2,6-naphthalenedicarboxylate).

A 500 mL round-bottom glass flask, equipped with a nitrogen inlet, a condensate outlet, an additive inlet and a stirrer, was charged with 0.5 mole of dimethyl 2,6-naphthalenedicarboxylate, 0.845 mole of ethylene glycol, 0.155 mole of 1,4-cy-clohexanedimethanol, and zinc (as zinc acetate, 50 ppm* as Zn based on the final polymer). The reaction flask was well purge with nitrogen and was heated to 200° C. The molten mixture was kept at 200° C. for 100 minutes and the temperature was raised to 220° C. After 60 minutes, the temperature was raised to 240° C., and phosphorus (as triethyl phosphate, 20 ppm as P based on the final polymer), cobalt (as cobaltous acetate tetrahydrate, 40 ppm as Co based on the final polymer) and 93 ppm of antimony (as antimony triacetate, 93 ppm as Sb based on the final polymer) were added. The temperature was raised to 275° C. and the pressure was reduced to 100 torr over 3 minutes. After 54 minutes, the pressure was then further reduced to 0.20 torr over 5 minutes and the temperature was raised to 285° C. After 60 minutes, the vacuum was relieved to atmospheric pressure with nitrogen. An extremely clear polymer melt resulted. The polymer was separated from the flask and ground to pass a 3-mm mesh screen.

* ppm by weight as the element and based on the theoretical weight of final polymer.

The invention has been described in detail with particular reference to preferred embodiments thereof, but it will be understood that variations and modifications can be effected within the spirit and scope of the invention. Moreover, all patents, patent applications (published and unpublished, foreign or domestic), literature references or other publications noted above are incorporated herein by reference for any disclosure pertinent to the practice of this invention.

We claim:

1. A polyester resin prepared by adding one or more dicarboxylic acid components to one or more glycol components, wherein said one or more dicarboxylic acid components is selected from the group consisting of aliphatic dicarboxylic acids having a total of from 3 to 16 carbon atoms, alicyclic dicarboxylic acids having 7 to 12 carbon atoms, aromatic dicarboxylic acids containing a total of from 8 to 16 carbon atoms, and combinations thereof, and wherein said 0.5 mole % or more of said one or more glycol components is 1,4-cyclohexanedimethanol and wherein the remaining 99.5 mole % or less of said one or more glycol components is selected from the group consisting of glycols other than 1,4-cyclohexanedimethanol having from 2 to 12 carbon atoms, glycol ethers having from 4 to 12 carbon atoms, and combinations thereof, the total mole percentages of said one or more glycol components equalling 100 mole %, said polyester resin having been prepared in the presence of a catalyst/stabilizer system consisting essentially of one or more antimony compounds and one or more phosphorous compounds and one or more compounds selected from the group consisting essentially of zinc compounds, gallium compounds, and silicon compounds.

2. The polyester resin of claim 1 wherein 5.0 mole % or more of said one or more glycol components is 1,4-cyclohexanedimethanol and wherein the remaining 95.0 mole % or less of said one or more glycol components is selected from the group consisting of glycols other than 1,4-cyclohexanedimethanol having from 2 to 12 carbon atoms, glycol ethers having from 4 to 12 carbon atoms, and combinations thereof, the total mole percentages of said one or more glycol components equalling 100 mole %.

3. The polyester of claim 1 wherein said glycols other than 1,4-cyclohexanedimethanol is selected from the group consisting essentially of ethylene glycol, 1,2-propanediol, 1,3-propanediol, 1,4-butanediol, 2,2-dimethyl-l,3-propanediol, 1,6-hexanediol, 1,2-cyclohexanediol, 1,4-cyclohexanediol, Z,8-bis(hydroxymethyl)-tricyclo-[5.2.1.0]-decane wherein Z represents 3, 4, or 5, diethylene glycol, triethylene glycol, dipropylene glycol and tripropylene glycol.

4. The polyester of claim 3 wherein said glycols other than 1,4-cyclohexanedimethanol comprise ethylene glycol.

5. The polyester of claim 4 wherein said ethylene glycol is present in the amount of 0.5 to 99.5 mole percent based on the total mole percentages for all glycol components being 100 mole %.

6. The polyester of claim 5 wherein said ethylene glycol is present in the amount of 30 to 99.5 mole percent based on the total percentages for all glycol components being 100 mole %.

7. The polyester of claim 6 wherein said ethylene glycol is present in the amount of 35 to 85 mole percent based on the total percentages for all glycol components being 100 mole %.

8. The polyester of claim 1 wherein said 1,4-cyclohexanedimethanol is present in the amount of 0.5 to 99.5 mole %.

9. The polyester of claim 8 wherein said 1,4-cyclohexanedimethanol is present in the amount of 0.5 to 70 mole %.

10. The polyester of claim 9 wherein said 1,4-cyclohexanedimethanol is present in the amount of 15 to 65 mole %.

11. The polyester of claim 1 wherein said dicarboxylic acid comprises terephthalic acid, isophthalic acid, 1,2-cyclohexanedicarboxylic acid, 1,4-cyclohexanedicarboxylic acid, 1,3-cyclohexanedicarboxylic acid, succinic acid, glutaric acid, adipic acid, sebacic acid, 1,12-dodecanedioic acid, 2,6-naphthalenedicarboxylic acid, 2,7-naphthalenedicarboxylic acid, 1,4-cyclohexanediacetic acid, diphenyl-4,4'-dicarboxylic acid and azelaic acid.

12. The polyester of claim 11 wherein said dicarboxylic acid is selected from the group consisting essentially of an aromatic dicarboxylic acid.

13. The polyester of claim 12 wherein said aromatic dicarboxylic acid comprises terephthalic acid, isophthalic acid, and 2,6-naphthalenedicarboxylic acid.

14. The polyester of claim 13 wherein said dicarboxylic acid comprises terephthalic acid.

15. The polyester of claim 14 wherein said terephthalic acid is present in the amount of at least 50 mole % based on the total mole percentages of the acids present in the polyester being 100 mole %.

16. The polyester of claim 15 wherein said terephthalic acid is present in the amount of 75 to 100 mole % based on the total mole percentages of the acids present in the polyester being 100 mole %.

17. The polyester of claim 16 wherein said terephthalic acid is present in the amount of 90 to 100 mole % based on the total mole percentages of the acids present in the polyester being 100 mole %.

18. The polyester of claim 1 wherein said antimony compound is an antimony compound having a valency of three or five.

19. The polyester of claim 18 wherein said antimony compounds selected from the group consisting essentially of tributyl antimony oxide, antimony alkoxides, $KSb(OH)_6$, $NH_4SbF_6$ and $SBS_3$, antimonate esters of inorganic acids, cyclic alkyl antimonate esters, and aryl antimonic acid compounds, antimony oxide, antimony trioxide, antimony carboxylate, antimony glycolate, antimony halide, antimony sulfide and sodium potassium antimonate.

20. The polyester of claim 19 wherein said antimony compound comprises antimony carboxylate, antimony glycolate, and antimony trioxide.

21. The polyester of claim 1 wherein said catalyst/stabilizer system comprises said antimony compound in the amount of 20 to 300 ppm and said phosphorous compound in the amount of 1 to 100 ppm.

22. The polyester of claim 1 wherein said catalyst/stabilizer system comprises said antimony compound in the amount of 75 to 125 ppm and said phosphorous compound in the amount of 5 to 80 ppm.

23. The polyester of claim 22 wherein said catalyst/stabilizer system additionally comprises said gallium compound and said silicon compound.

24. The polyester of claim 23 wherein said gallium compound is present in the amount of 5 to 100 ppm and said silicon compound is present in the amount of 50 to 500 ppm.

25. The polyester of claim 21 wherein said catalyst/ stabilizer system additionally comprises said gallium compound and said zinc compound.

26. The polyester of claim 25 wherein said gallium compound is present in the amount of from 5 to 100 ppm and said zinc compound is present in the amount of from 25 to 100 ppm.

27. The polyester of claim 21 wherein said catalyst/ stabilizer system additionally comprises said silicon compound and said zinc compound.

28. The polyester of claim 1 wherein said silicon compound is present in the amount of 50 to 500 ppm and said zinc compound is present in the amount of 25 to 100 ppm.

29. The polyester of claim 21 wherein said gallium compound is present in the amount of 5 to 100 ppm.

30. The polyester of claim 21 wherein said silicon is present in the amount of 50 to 500 ppm.

31. The polyester of claim 21 wherein said zinc is present in the amount of 25 to 100 ppm.

32. A process for preparing a polyester resin wherein one or more dicarboxylic acid components are added to one or more glycol components, wherein said one or more dicarboxylic acid components is selected from the group consisting of aliphatic dicarboxylic acids having a total of from 3 to 16 carbon atoms, alicyclic dicarboxylic acids having 7 to 12 carbon atoms, aromatic dicarboxylic acids containing a total of from 8 to 16 carbon atoms, and combinations thereof, and wherein 0.5 mole % or more of said one or more glycol components is 1,4-cyclohexanedimethanol and wherein the remaining 99.5 mole % or less of said one or more glycol components is selected from the group consisting of glycols other than 1,4-cyclohexanedimethanol having from 2 to 12 carbon atoms, glycol ethers having from 4 to 12 carbon atoms, and combinations thereof, the total mole percentages of said one or more glycol components equalling 100 mole %, said polyester resin having been prepared in the presence of a catalyst/stabilizer system consisting essentially of one or more antimony compounds and one or more phosphorous compounds and one or more compounds selected from the group consisting essentially of zinc compounds, gallium compounds, and silicon compounds.

33. The process of claim 32 wherein said catalyst/stabilizer system comprises said antimony compound in the amount of 20 to 300 ppm and said phosphorous compound in the amount of 1 to 100 ppm.

34. The process of claim 33 wherein said catalyst/stabilizer system additionally comprises said gallium compound and said silicon compound.

35. The process of claim 34 wherein said gallium compound is present in the amount of 5 to 100 ppm and said silicon compound is present in the amount of 50 to 500 ppm.

36. The process of claim 33 wherein said catalyst/stabilizer system additionally comprises said gallium compound and said zinc compound.

37. The process of claim 36 wherein said gallium compound is present in the amount of from 5 to 100 ppm and said zinc compound is present in the amount of from 25 to 100 ppm.

38. The process of claim 33 wherein said catalyst/stabilizer system additionally comprises said silicon compound and said zinc compound.

39. The process of claim 38 wherein said silicon compound is present in the amount of 50 to 500 ppm and said zinc compound is present in the amount of 25 to 100 ppm.

40. The process of claim 33 wherein said gallium compound is present in the amount of 5 to 100 ppm.

41. The process of claim 33 wherein said silicon is present in the amount of 50 to 500 ppm.

42. The process of claim 33 wherein said zinc is present in the amount of 25 to 100 ppm.

43. The process of claim 33 wherein said catalyst/stabilizer system additionally comprises one or more gallium compounds, one or more zinc compounds, and one or more silicon compounds.

44. The process of claim 32 wherein 5.0 mole % or more of said one or more glycol components is 1,4-cyclohexanedimethanol and wherein the remaining 95.0 mole % or less of said one or more glycol components is selected from the group consisting of glycols other than 1,4-cyclohexanedimethanol having from 2 to 12 carbon atoms, glycol ethers having from 4 to 12 carbon atoms, and combinations thereof, the total mole percentages of said one or more glycol components equalling 100 mole %.

45. The process of claim 44 wherein said glycol comprises ethylene glycol.

46. The process of claim 45 wherein said ethylene glycol is present in the amount of 0.5 to 99.5 mole percent based on the total percentages for all glycol components being 100 mole %.

47. The process of claim 45 wherein said ethylene glycol is present in the amount of 65 to 99.5 mole percent based on the total percentages for all glycol components being 100 mole %.

48. The process of claim 46 wherein said ethylene glycol is present in the amount of 35 to 85 mole percent based on the total percentages for all glycol components being 100 mole %.

49. The process of claim 45 wherein said polyester comprises at least about 50 mole percent ethylene glycol, 1,4-cyclohexanedimethanol and mixtures thereof.

50. The process of claim 1 wherein said dicarboxylic acid selected from the group consisting essentially of terephthalic acid, isophthalic acid, 1,4-cyclohexanedicarboxylic acid, 1,3-cyclohexanedicarboxylic acid, succinic acid, glutaric acid, adipic acid, sebacic acid, 1,12dodecanedioic acid and 2,6-naphthalenedicarboxylic acid and 2,7-naphthalenedicarboxylic acid.

51. The process of claim 1 wherein said dicarboxylic acid comprises an aromatic dicarboxylic acid.

52. The process of claim 51 wherein said dicarboxylic acid comprises terephthalic acid, isophthalic acid, and 2,6-naphthalenedicarboxylic acid.

53. The process of claim 52 wherein said dicarboxylic acid comprises terephthalic acid.

54. The process of claim 53 wherein said terephthalic acid is present in the amount of at least 50 mole % based on the total mole percentages of the acids present in said polyester being 100 mole %.

55. The process of claim 54 wherein said terephthalic acid is present in the amount of 75 to 100 mole % based on the total mole percentages of the acids present in said polyester being 100 mole %.

56. The process of claim 55 wherein said terephthalic acid is present in the amount of 90 to 100 mole % based on the total mole percentages of the acids present in said polyester being 100 mole %.

57. The process of claims 55 and 56 wherein said polyester further comprises 65 to 100 mole % ethylene glycol.

58. The process of claim 1 wherein said antimony compound has a valency of three or five.

59. The process of claim 58 wherein said antimony compounds selected from the group consisting essentially of tributyl antimony oxide, $KSb(OH)_6$, $NH_4SbF_6$ and $SBS_3$, antimonate esters of inorganic acids, cyclic alkyl antimonate esters, and aryl antimonic acid compounds, antimony oxide, antimony trioxide, antimony carboxylate, antimony glycolate, antimony halide, antimony sulfide and sodium and potassium antimonate.

60. The process of claim 59 wherein said antimony compound comprises antimony carboxylate, antimony glycolate, and antimony trioxide.

* * * * *